United States Patent
Jang et al.

(10) Patent No.: US 10,611,143 B2
(45) Date of Patent: Apr. 7, 2020

(54) METHOD OF INSPECTING LIQUID CHEMICALS

(71) Applicant: Semes Co., Ltd., Cheonan-si (KR)

(72) Inventors: Sukwon Jang, Seoul (KR); Sang Hwan Park, Gongju-si (KR); Kwangwoon Choi, Cheonan-si (KR); Subeom Jeon, Cheonan-si (KR)

(73) Assignee: Semes Co., Ltd., Cheonan-si (KR)

(*) Notice: Subject to any disclaimer, the term of this patent is extended or adjusted under 35 U.S.C. 154(b) by 0 days.

(21) Appl. No.: 16/267,410

(22) Filed: Feb. 5, 2019

(65) Prior Publication Data

US 2019/0255836 A1    Aug. 22, 2019

(30) Foreign Application Priority Data

Feb. 20, 2018  (KR) .................. 10-2018-0019651
Nov. 13, 2018  (KR) .................. 10-2018-0138936

(51) Int. Cl.
*B41J 2/045* (2006.01)
*G01N 15/02* (2006.01)
*B41J 2/21* (2006.01)
*G01N 15/10* (2006.01)

(52) U.S. Cl.
CPC .......... *B41J 2/0451* (2013.01); *B41J 2/0456* (2013.01); *B41J 2/04561* (2013.01); *B41J 2/21* (2013.01); *G01N 15/0211* (2013.01); *G01N 2015/1062* (2013.01)

(58) Field of Classification Search
CPC .............. G01N 21/00; G01N 15/1434; G01N 15/0211; G01N 15/1459; B41J 2/0451; B41J 2/0456; B41J 2/04561; B41J 2/16579; B41J 2/2142
See application file for complete search history.

(56) References Cited

U.S. PATENT DOCUMENTS

| 6,529,228 B1* | 3/2003 | Koide ................ B41J 2/1604 347/224 |
| 2010/0055396 A1* | 3/2010 | Kim .................... H05K 3/1208 428/141 |
| 2018/0236794 A1* | 8/2018 | Mizuno ................ B41J 2/2146 |

FOREIGN PATENT DOCUMENTS

| JP | 2006-110774 A | 4/2006 |
| JP | 2006-112841 A | 4/2006 |
| JP | 2013-063578 A | 4/2013 |
| KR | 10-2008-0105669 A | 12/2008 |
| KR | 10-2016-0142076 A | 12/2016 |

* cited by examiner

*Primary Examiner* — Jonathan M Hansen
(74) *Attorney, Agent, or Firm* — Daly Crowley Mofford & Durkee, LLP

(57) ABSTRACT

In a method of inspecting liquid chemicals discharged from an ink jet head according to example embodiments, at least two laser beams may be irradiated onto the liquid chemicals discharged from the ink jet head, and the conditions of the liquid chemicals may be identified by detecting an interference pattern obtained from a laser scattering generated by passing the liquid chemicals through the at least two laser beams.

6 Claims, 2 Drawing Sheets

METHOD OF INSPECTING LIQUID CHEMICALS

CROSS-REFERENCE TO RELATED APPLICATIONS

This application claims priorities to Korean Patent Application No. 10-2018-0019651 filed on Feb. 20, 2018 and Korean Patent Application No. 10-2018-0138936 filed on Nov. 13, 2018 in the Korean Intellectual Property Office (KIPO), the contents of which are herein incorporated by reference in their entireties.

BACKGROUND

1. Field

Example embodiments of the invention relate to methods of inspecting liquid chemicals. More particularly, example embodiments of the invention relate to methods of inspecting conditions of liquid chemicals discharged from an ink jet head.

2. Related Technology

In the conventional printing process, failure may be generated in a pattern formed on a substrate if the condition of liquid chemicals discharged from an ink jet head is abnormal. In the conventional printing process, the conditions of the liquid chemicals discharged the ink jet head, for example, the discharge speed of the liquid chemicals, the discharge angle of the liquid chemicals, the volume of the liquid chemicals, the number of the liquid chemicals, the normal or abnormal discharge of the liquid chemicals, etc. may be inspected.

However, there is not provided a method of inspecting the discharge speed of the liquid chemicals, the discharge angle of the liquid chemicals, the volume of the liquid chemicals, the number of the liquid chemicals, and the normal or abnormal discharge of the liquid chemicals at a time. Further, there is not still exist a method of exactly inspecting the discharge speed of the liquid chemicals, the discharge angle of the liquid chemicals, the number of the liquid chemicals, and the normal or abnormal discharge of the liquid chemicals.

Although an inspection apparatus such as a drop watcher is used for exactly inspecting the conditions of the liquid chemicals discharged from the ink jet head, relatively large space may be needed and the time for inspecting the conditions of the liquid chemicals may be increased when the conditions of the liquid chemicals are inspected using the drop watcher.

SUMMARY

It is an object of the invention to provide a method of inspecting liquid chemicals, which can exactly inspect at a time the conditions of the liquid chemicals including the discharge speed of the liquid chemicals, the discharge angle of the liquid chemicals, the volume of the liquid chemicals, the number of the liquid chemicals, the normal or abnormal discharge of the liquid chemicals, etc.

According to an aspect of the invention, there is provided a method of inspecting liquid chemicals discharged from an ink jet head. The method of inspecting liquid chemicals according to example embodiments may include irradiating at least two laser beams onto the liquid chemicals discharged from the ink jet head, and identifying conditions of the liquid chemicals by detecting an interference pattern obtained from a laser scattering generated by passing the liquid chemicals through the at least two laser beams.

In example embodiments, the identifying of the conditions of the liquid chemicals may identify a discharge speed of the liquid chemicals discharged from the ink jet head, a discharge angle of the liquid chemicals discharged from the ink jet head, a volume of the liquid chemicals discharged from the ink jet head, a number of the liquid chemicals discharged from the ink jet head, a normal or abnormal discharge of the liquid chemicals discharged from the ink jet head, etc. Further, the identifying of the conditions of the liquid chemicals may identify at a time the discharge speed of the liquid chemicals, the discharge angle of the liquid chemicals, the volume of the liquid chemicals, the number of the liquid chemicals, the normal or abnormal discharge of the liquid chemicals, etc.

In some example embodiments, the discharge speed of the liquid chemicals discharged from the ink jet head may be identified based on a first time when the liquid chemicals pass by a first point of the interference pattern, a second time when the liquid chemicals pass by a second point of the interference pattern, and a distance between the first point and the second point.

In some example embodiments, the discharge angle of the liquid chemicals discharged from the ink jet head may be identified based on, when the liquid chemicals pass by a third point of the interference pattern, a fourth point of the interference pattern and a fifth point of the interference pattern substantially perpendicular to the third point and substantially parallel to the fourth point, a tangent value of a distance between the third point and fifth point and a distance between the fourth point and the fifth point.

In some example embodiments, the volume of the liquid chemicals discharged from the ink jet head may be identified based on a phase difference between the at least two laser beams in the interference pattern obtained from the laser scattering.

In some example embodiments, the number of the liquid chemicals and the normal or abnormal discharge of the liquid chemicals may be identified by counting the liquid chemicals passing through the at least two laser beams.

According to example embodiments of the invention, the conditions of the liquid chemicals may be identified by detecting the interference pattern of the laser beams obtained from the laser scattering generated by at least two laser beams. Therefore, it can be possible to identify at a time the various conditions of the liquid chemicals such as the discharge speed of the liquid chemicals, the discharge angle of the liquid chemicals, the volume of the liquid chemicals, the number of the liquid chemicals, the normal or abnormal discharge of the liquid chemicals, etc. Further, the method of inspecting may be performed using the inspection apparatus including the laser beam generating member for irradiating the at least two laser beams onto the liquid chemicals, and the laser beam receiving member for detecting the at least two laser beams. Accordingly, the space for the inspection apparatus may be reduced. Moreover, in the method of inspecting liquid chemicals according to example embodiments, the liquid chemicals may be inspected using the laser beams so that the various conditions of the liquid chemicals may be rapidly identified.

BRIEF DESCRIPTION OF THE DRAWINGS

Example embodiments will be more clearly understood from the following detailed description taken in conjunction with the accompanying drawing. The following figures represent non-limiting, example embodiments as described herein.

DESCRIPTION OF EMBODIMENTS

Figure 1:
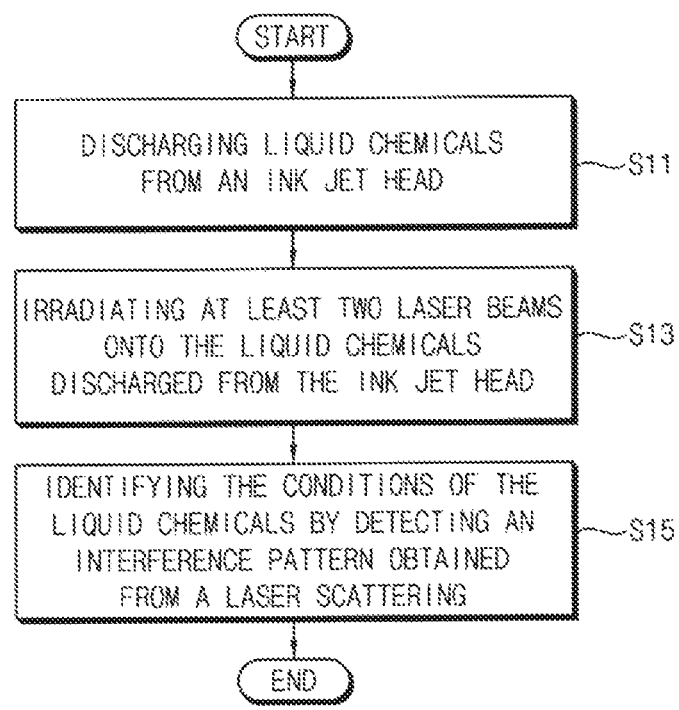
FIG. 1 is a flow chart illustrating a method of inspecting liquid chemicals in accordance with example embodiments of the invention.

Various embodiments will be described more fully hereinafter with reference to the accompanying drawings, in which some embodiments are shown. The invention may, however, be embodied in many different forms and should not be construed as limited to the embodiments set forth herein. Rather, these embodiments are provided so that this description will be thorough and complete, and will fully convey the scope of the invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (for example, rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include a plurality of forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-sectional illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the face through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, methods of inspecting liquid chemicals according to example embodiments of the invention will be described with reference to the accompanying drawings. In the accompanying drawings, like or similar elements may be designated using like or similar reference numerals.

FIG. 1 is a flow chart illustrating a method of inspecting liquid chemicals in accordance with example embodiments of the invention.

Referring to FIG. 1, the method of inspecting liquid chemicals according to example embodiments may inspect and may identify the conditions of liquid chemicals discharged from an ink jet head of a printing apparatus in a printing process for forming a pattern, for example, an alignment layer or a color filter on an object such as a substrate during manufacturing of a display device or an integrated circuit device.

The ink jet head may form the pattern such as the alignment layer of the color filter on the object. The ink jet head may include a plurality of nozzles capable of providing the liquid chemicals onto the object. For example, the ink jet head may have about one hundred and twenty-five nozzles or about two hundred and fifty-six nozzles. In this case, the plurality of nozzles may be arranged in a plurality of rows or may be disposed in a substantial zigzag configuration.

In the method of inspecting liquid chemicals according to example embodiments, the conditions of the liquid chemicals discharged from the plurality of nozzles of the ink jet head may be inspected and identified, and also the operations of the plurality of nozzles may be inspected in accordance with the inspection results and/or the identification results for the liquid chemicals.

As illustrated in FIG. 1, the liquid chemicals may be supplied onto the object from the ink jet head so as to form a desired pattern on the object in step S11 of the method of inspecting liquid chemicals according to example embodiments. For example, each of the plurality of nozzles of the ink jet head may provide the liquid chemicals onto the object in the printing process.

In step S13 of the method of inspecting liquid chemicals, a laser beam may be irradiated onto the liquid chemicals discharged from the ink jet head onto the object. According to example embodiments, at least two laser beams may be irradiated onto the liquid chemicals discharged from the ink jet head. For example, more than two laser beams having substantially identical or different wavelengths or frequencies may be irradiated toward the liquid chemicals provided onto the object from each of the nozzles of the ink jet head.

In example embodiments, the laser beams may be generated from a laser beam generating means, and then may irradiated onto the liquid chemicals discharged from the ink jet head. Hereinafter, the laser beam generating means may be referred to as a laser beam generating member. Additionally, a laser beam receiving member described below may detect the laser beams passing through the liquid chemicals discharged from the ink jet head, and thus may identify the conditions of the liquid chemicals.

According to example embodiments, the method of inspecting liquid chemicals may be performed using an inspection apparatus including the laser beam generating member capable of generating the at least two laser beams, and the laser beam receiving member for detecting the at least two laser beams. For example, the laser beam generating member of the inspection apparatus may include four laser beam generators capable of irradiating laser beams having substantially identical or different wavelengths or frequencies onto the liquid chemicals provided from the ink jet head. Additionally, the laser beam receiving member of the inspection apparatus may include three photo detectors capable of detecting the laser beams passed through the liquid chemicals.

In the method of inspecting liquid chemicals, the at least two laser beams may pass through the liquid chemicals discharged from the ink jet head, and scattering phenomenon may be caused by the laser beams passed through the liquid chemicals such that an interference pattern may be generated from the laser beams passed through the liquid chemicals. In this case, a measurement region having a predetermined size may be formed between the ink jet head and the object by irradiating the at least two laser beams toward the liquid chemicals. When the liquid chemicals discharged from the ink jet head pass through the measurement region, the laser scattering may be caused from the at least two laser beams to thereby obtain the optical interference pattern of the laser beams.

In example embodiments, the interference pattern of the laser beams may be generated from the phase difference or the variation of frequencies between the laser beams caused by the laser scattering. This interference pattern of the laser beams may be represented as an imaginary pattern having a substantial matrix configuration as described below.

Referring now to FIG. 1, in step S15 of the method of inspecting liquid chemicals, the interference pattern of the at least two laser beams may be obtained from the laser scattering caused by irradiating the at least two laser beams onto the liquid chemicals, and the interference pattern may be detected using the laser beam detecting member such that the conditions of the liquid chemicals may be identified.

In the method of inspecting liquid chemicals according to example embodiments, a predetermined number of liquid chemicals may be discharged onto the object from a nozzle to be inspected of the ink jet head (hereinafter, referred to as "the inspected nozzle"), and the liquid chemicals may pass through the at least two laser beams in the measurement region. Accordingly, the interference pattern of the at least two laser beams may be obtained as the imaginary pattern and the operation of the inspected nozzle and the conditions of the liquid chemicals discharged from the inspected nozzle may be identified by detecting the interference pattern. If the operation of the inspected nozzle is not normal or the liquid chemicals are not in the desired conditions, the operation of the inspected nozzle may be compensated or the conditions of the liquid chemicals may be changed. As a result, the desired pattern may be formed on the object by the method of inspecting liquid chemicals.

In the method of inspecting liquid chemicals according to example embodiments, the process for identifying the conditions of the liquid chemicals may identify the discharge speed of the liquid chemicals discharged from the ink jet head, the discharge angle of the liquid chemicals discharged from the ink jet head, the volume of the liquid chemicals discharged from the ink jet head, the number of the liquid chemicals discharged from the ink jet head, the normal or abnormal discharge of the liquid chemicals discharged from the ink jet head, etc. According to example embodiments, the process for identifying the conditions of the liquid chemicals may identify at a time the conditions of the liquid chemicals including the discharge speed of the liquid chemicals, the discharge angle of the liquid chemicals, the volume of the liquid chemicals, the number of the liquid chemicals, and the normal or abnormal discharge of the liquid chemicals. In other words, all of the conditions of the liquid chemicals provided from the inspected nozzle, such as the discharge speed of the liquid chemicals, the discharge angle of the liquid chemicals, the volume of the liquid chemicals, the number of the liquid chemicals, and the normal or abnormal discharge of the liquid chemicals, may be identified by detecting once the interference pattern obtained from the passing of the liquid chemicals through the at least two laser beams in the measurement region.

In some example embodiments, the inspection apparatus including the laser beam generating member and the laser beam receiving member may be fixed, and the method of inspecting liquid chemicals may be performed while moving the ink jet head over the object. In other example embodiments, the ink jet head may be fixed over the object and the method of inspecting liquid chemicals may be carried out while moving the inspection apparatus over the object. In still other example embodiments, the method of inspecting liquid chemicals may be executed while simultaneously moving the inspection apparatus and the ink jet head over the object.

Figure 2:
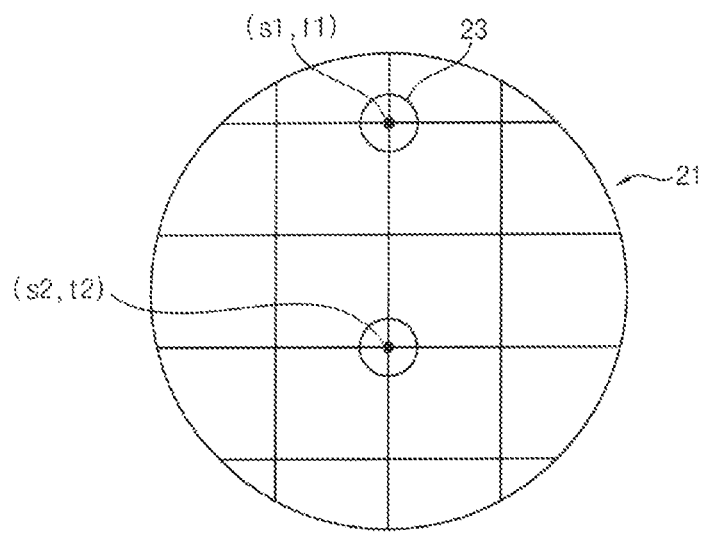
FIG. 2 is a schematic view illustrating a process of identifying discharge speed of liquid chemicals in the method of inspecting liquid chemicals in accordance with example embodiments of the invention.

FIG. 2 is a schematic view illustrating a process of identifying discharge the speed of the liquid chemicals discharged from the ink jet head in the method of inspecting liquid chemicals in accordance with example embodiments of the invention.

Referring to FIG. 2, in the method of inspecting liquid chemicals according to example embodiments, the liquid chemicals 23 may be provided onto the object from the inspected nozzle of the ink jet head. Then, the at least two laser beams may be irradiated onto the liquid chemicals 23 so as to identify the discharge speed of the liquid chemicals 23 from the inspected nozzle.

As described above, the laser scattering may be caused by passing the at least two laser beams through the liquid chemicals 23 discharged from the inspected nozzle, and thus the interference pattern 21 indicating the variation of frequencies of the at least two laser beams from the laser scattering.

In example embodiments, the discharge speed of the liquid chemicals 23 provided from the inspected nozzle may be identified by detecting a first time t1 when the liquid chemicals 23 pass by a first point s1 of the interference pattern 21 and a second time t2 when the liquid chemicals 23 pass by a second point s2 of the interference pattern 21, and by measuring a distance between the first point s1 and the second point s2. That is, the discharge speed of the liquid chemicals 23 may be identified based on the first time t1, the second time t2 and the distance between the first point s1 and the second point s2.

Figure 3:
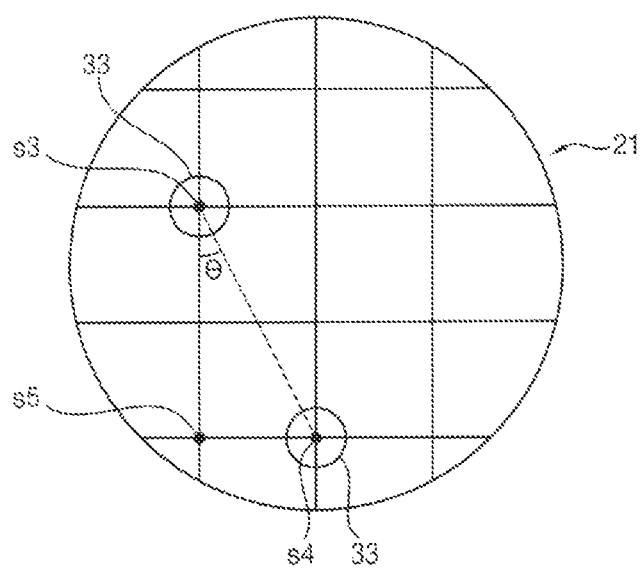
FIG. 3 is a schematic view illustrating a process of identifying discharge angle of liquid chemicals in the method of inspecting liquid chemicals in accordance with example embodiments of the invention.

FIG. 3 is a schematic plan view illustrating a process of identifying the discharge angle of the liquid chemicals discharged from the ink jet head in the method of inspecting liquid chemicals in accordance with example embodiments of the invention.

Referring to FIG. 3, in the method of inspecting liquid chemicals, the discharge angle of the liquid chemicals 33 may be identified based on the interference pattern 21 as similar to the discharge speed of the liquid chemicals 23.

According to example embodiments, the discharge angle of the liquid chemicals 33 provided from the inspected nozzle may be identified by measuring a tangent (tan) value of a distance between a third point s3 of the interference pattern 21 and a fifth point s5 of the interference pattern 21, and a distance between the fifth point s5 and a fourth point s4 of the interference pattern 21 when the liquid chemicals 33 pass by the third point s3, the fourth point s4, and the fifth point s5 substantially perpendicular to the third point s3 and substantially parallel to the fourth point s4. That is, the discharge angle of the liquid chemicals 33 may be identified based on the tangent value of the distance between the third point s3 and the fifth point s5, and the distance between the fifth point s5 and the fourth point.

In some example embodiments, the volume of the liquid chemicals discharged from the inspected nozzle may be identified based on the phase difference between the at least two laser beams in the interference pattern obtained from the laser scattering when the liquid chemicals pass through the at least two laser beams.

In some example embodiments, the number of the liquid chemicals and the normal or abnormal discharge of the liquid chemicals from the inspected nozzle may be identified by counting the liquid chemicals passing through the at least two laser beams.

As described above, in the method of inspecting liquid chemicals according to example embodiments, the conditions of the liquid chemicals may be identified by detecting the interference pattern of the laser beams obtained from the laser scattering generated by at least two laser beams. Therefore, it can be possible to identify at a time the various conditions of the liquid chemicals such as the discharge speed of the liquid chemicals, the discharge angle of the liquid chemicals, the volume of the liquid chemicals, the number of the liquid chemicals, the normal or abnormal discharge of the liquid chemicals, etc. Further, the method of inspecting may be performed using the inspection apparatus including the laser beam generating member for irradiating the at least two laser beams onto the liquid chemicals, and the laser beam receiving member for detecting the at least two laser beams. Accordingly, the space for the inspection apparatus may be reduced. Moreover, in the method of inspecting liquid chemicals according to example embodiments, the liquid chemicals may be inspected using the laser beams so that the various conditions of the liquid chemicals may be rapidly identified.

In some example embodiments, a point of the object where the liquid chemicals are provided may be identified based on the discharge angle of the liquid chemicals discharged from the inspected nozzle. If the point of the object is beyond a manufacturing tolerance, the inspected nozzle may be determined as the inspected nozzle supplies the liquid chemicals onto the object along a diagonal line. In this case, the operation of the inspected nozzle may be corrected to exactly from the desired pattern on the object.

In some example embodiments, the failure of the inspected nozzle may be determined based on the measurement of the number of the liquid chemicals. For example, when about 20 liquid chemical droplets per unit time are measured as they discharged from the inspected nozzle although the inspected nozzle is set to provide about 50 liquid chemical droplets per unit time, the inspected nozzle is identified as the liquid chemicals are insufficiently supplied from the inspected nozzle, or the liquid chemicals are supplied in the diagonal direction. Therefore, the operation of the inspected nozzle may be corrected or the amount of the liquid chemicals discharged from the inspected nozzle may be adjusted such that the desired pattern may be more exactly formed on the object. Meanwhile, when about 100 liquid chemical droplets per unit time are discharged from the inspected nozzle or substantially 0 liquid chemical droplet per unit time is supplied from the inspected nozzle, the failure of the inspected nozzle may be identified.

In the method of inspecting liquid chemicals according to example embodiments, the failure of the inspected nozzle may be determined by identifying the conditions of the liquid chemicals such as the number of the liquid chemicals and the normal or abnormal discharge of the liquid chemicals. Reference data associated with such identified conditions of the liquid chemicals and the failure of the inspected nozzle may be generated and may be set an interlock to indicate the failure of the nozzle when the data of the nozzle is different from the reference data. In this case, the operation of the nozzle may be corrected using an automatic correction algorithm exactly form the desired pattern on the object. Additionally, the individual reference data associated with the operations of the individual nozzles of the ink jet head may be prepared and the operation of the ink jet head may be controlled based on the individual reference data.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A method of inspecting liquid chemicals discharged from an ink jet head, which comprises:
   irradiating at least two laser beams onto the liquid chemicals discharged from the ink jet head; and
   identifying conditions of the liquid chemicals by detecting an interference pattern obtained from a laser scattering generated by passing the liquid chemicals through the at least two laser beams.

2. The method of inspecting liquid chemicals of claim 1, wherein the identifying of the conditions of the liquid chemicals identifies a discharge speed of the liquid chemicals discharged from the ink jet head, a discharge angle of the liquid chemicals discharged from the ink jet head, a volume of the liquid chemicals discharged from the ink jet head, a number of the liquid chemicals discharged from the ink jet head, and a normal or abnormal discharge of the liquid chemicals discharged from the ink jet head, and
   the identifying of the conditions of the liquid chemicals identifies at a time the discharge speed of the liquid chemicals, the discharge angle of the liquid chemicals, the volume of the liquid chemicals, the number of the liquid chemicals, and the normal or abnormal discharge of the liquid chemicals.

3. The method of inspecting liquid chemicals of claim 2, wherein the discharge speed of the liquid chemicals discharged from the ink jet head is identified based on a first time when the liquid chemicals pass by a first point of the interference pattern, a second time when the liquid chemicals pass by a second point of the interference pattern, and a distance between the first point and the second point.

4. The method of inspecting liquid chemicals of claim 2, wherein the discharge angle of the liquid chemicals discharged from the ink jet head is identified based on, when the liquid chemicals pass by a third point of the interference pattern, a fourth point of the interference pattern and a fifth point of the interference pattern perpendicular to the third point and parallel to the fourth point, a tangent value of a distance between the third point and fifth point and a distance between the fourth point and the fifth point.

5. The method of inspecting liquid chemicals of claim 2, wherein the volume of the liquid chemicals discharged from the ink jet head is identified based on a phase difference between the at least two laser beams in the interference pattern obtained from the laser scattering.

6. The method of inspecting liquid chemicals of claim 2, wherein the number of the liquid chemicals and the normal or abnormal discharge of the liquid chemicals are identified by counting the liquid chemicals passing through the at least two laser beams.

* * * * *